(12) United States Patent
Oh

(10) Patent No.: US 7,806,156 B2
(45) Date of Patent: Oct. 5, 2010

(54) TREAD PATTERN HAVING WAVE-SHAPED AND STRAIGHT GROOVES

(75) Inventor: Ho Kyung Oh, Songpa-Gu (KR)

(73) Assignee: Hankook Tire Co., Ltd., Gangnam-gu, Seoul (KR)

( * ) Notice: Subject to any disclaimer, the term of this patent is extended or adjusted under 35 U.S.C. 154(b) by 69 days.

(21) Appl. No.: 11/200,424

(22) Filed: Aug. 9, 2005

(65) Prior Publication Data

US 2006/0032567 A1 Feb. 16, 2006

(30) Foreign Application Priority Data

Aug. 11, 2004 (KR) ...................... 10-2004-0063182

(51) Int. Cl.
*B60C 11/13* (2006.01)

(52) U.S. Cl. ................. 152/209.24; 152/209.8

(58) Field of Classification Search ............ 152/209.18, 152/209.24, 209.28, 209.21, 209.8
See application file for complete search history.

(56) References Cited

U.S. PATENT DOCUMENTS

| | | | | |
|---|---|---|---|---|
| 2,843,172 A | * | 7/1958 | Berry et al. ............ | 152/209.21 |
| 5,099,899 A | * | 3/1992 | Takeuchi ............... | 152/209.21 |
| 5,450,885 A | * | 9/1995 | Hanya ................... | 152/209.28 |
| 5,964,267 A | * | 10/1999 | Poque et al. ........... | 152/209.24 |
| 6,609,548 B2 | * | 8/2003 | Kousaie et al. ......... | 152/209.24 |
| 2005/0092413 A1 | * | 5/2005 | Miyazaki ............... | 152/209.24 |

FOREIGN PATENT DOCUMENTS

| | | | |
|---|---|---|---|
| GB | 460338 | * | 1/1937 |
| JP | 05-319026 | * | 12/1993 |
| JP | 06-320914 | * | 11/1994 |
| JP | 09-136515 | * | 5/1997 |
| JP | 2003-146024 | * | 5/2003 |

* cited by examiner

*Primary Examiner*—Steven D Maki
(74) *Attorney, Agent, or Firm*—Merchant & Gould P.C.

(57) ABSTRACT

A tread pattern of a tire is disclosed which has wave-shaped and straight grooves capable of maintaining desired block rigidity and hydroplaning performance of the tire. In the tread pattern, which includes circumferential main grooves, transversal grooves formed between adjacent ones of the circumferential main grooves, and blocks formed between adjacent ones of the transversal grooves, at least one of the circumferential main grooves has a wave-shaped structure having opposite inclined side surfaces each comprising an upper surface portion having first and second curved surfaces alternately arranged along a circumferential direction of the tire while having substantially opposite curvatures, respectively, to form a continuous wave-shaped surface, and a lower surface portion having a straight side surface connected to the alternate first and second curved surfaces while extending along the circumferential direction to form a circumferential straight groove.

4 Claims, 5 Drawing Sheets

[FIG. 1]
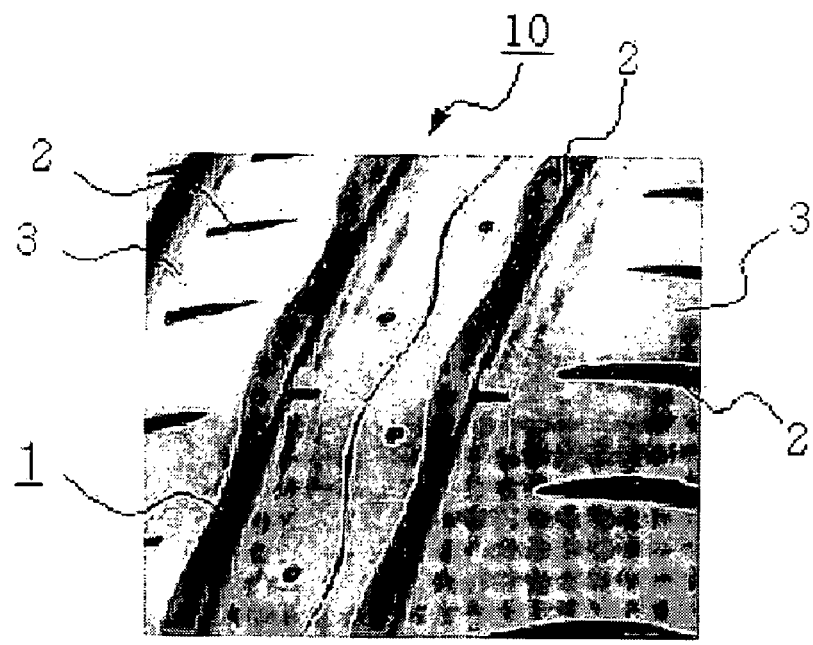
[FIG. 2]
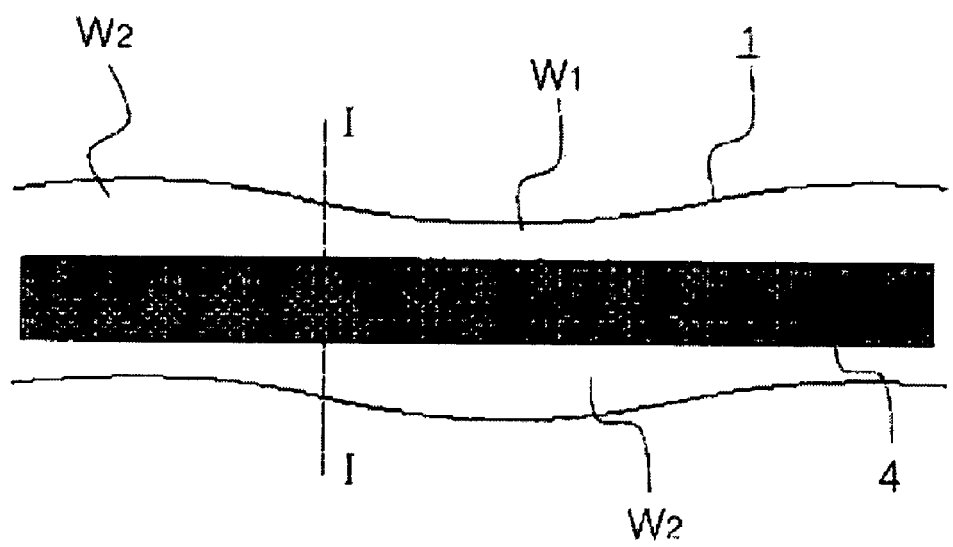

[FIG. 3]
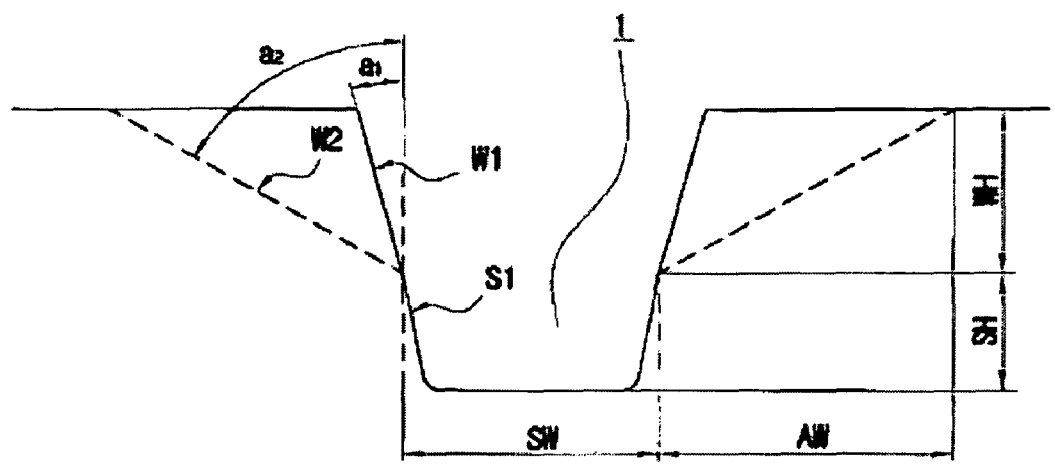
[FIG. 4]
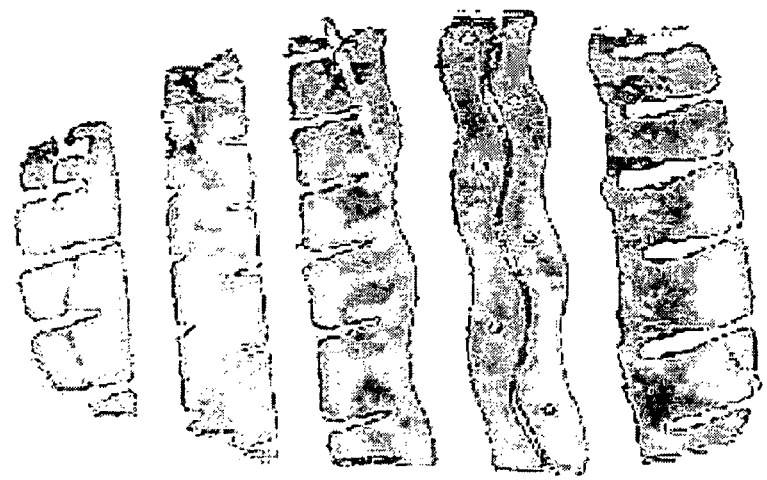

[FIG.5]
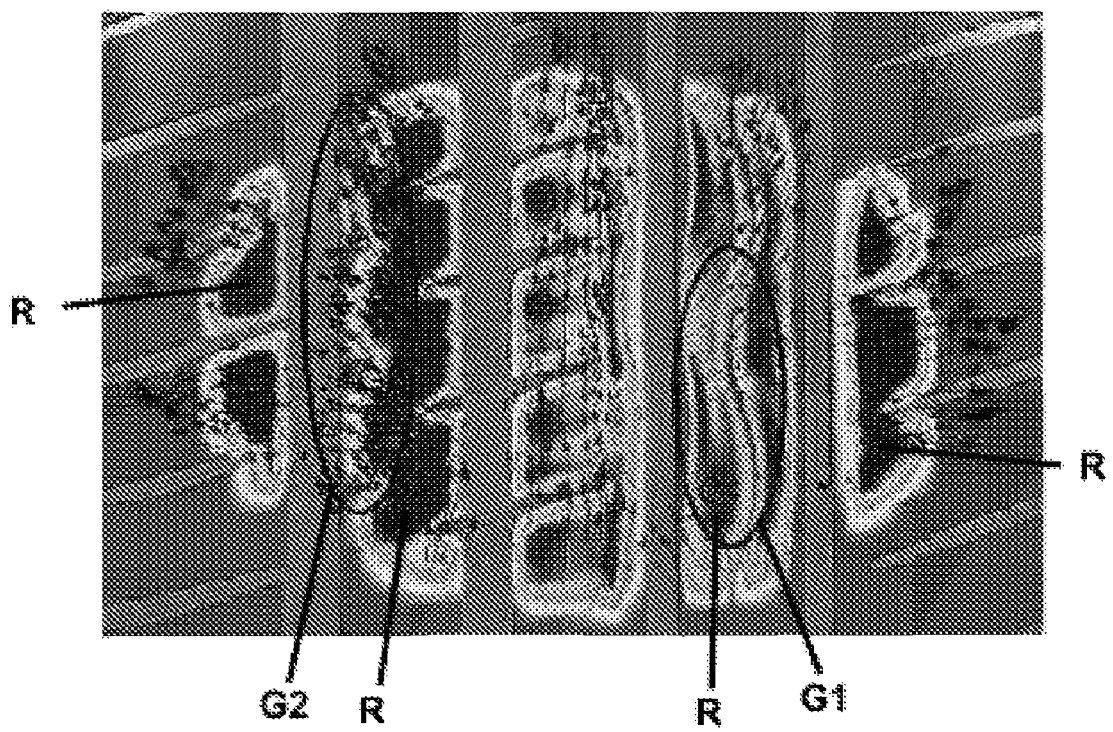
[FIG.6]
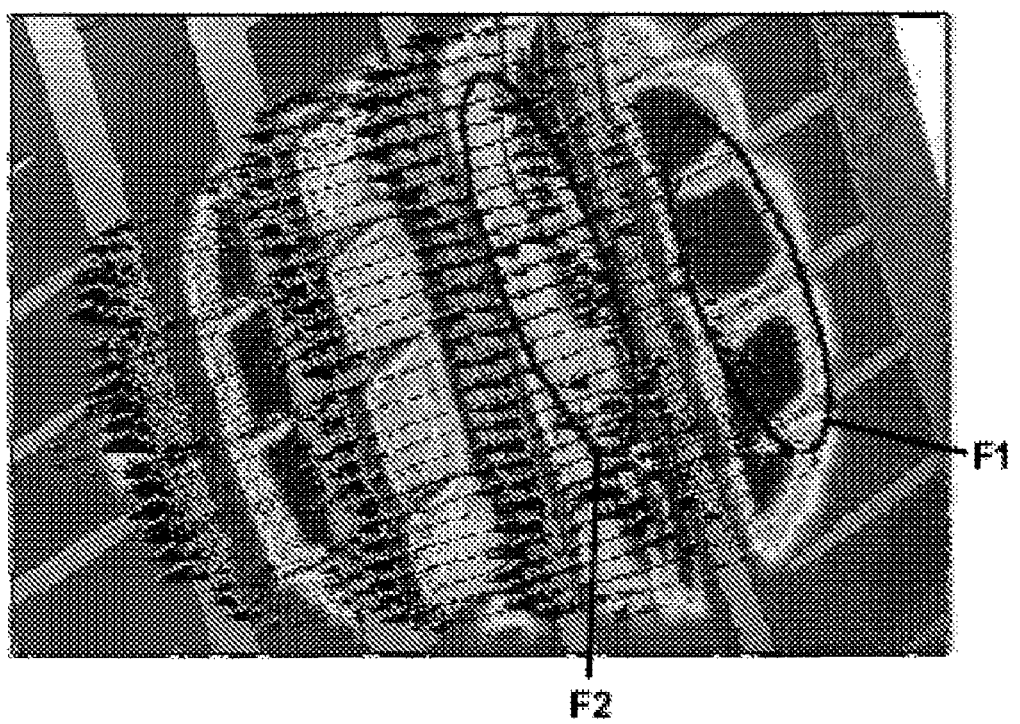

[FIG. 7]
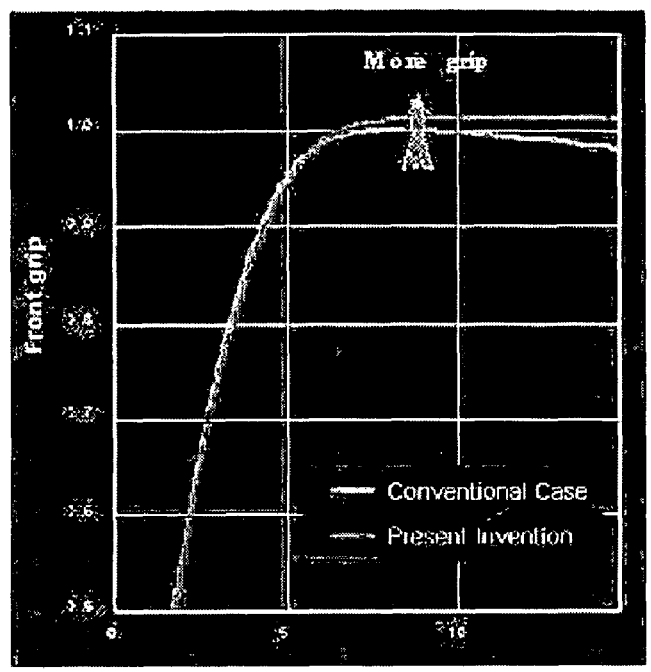
[FIG. 8]
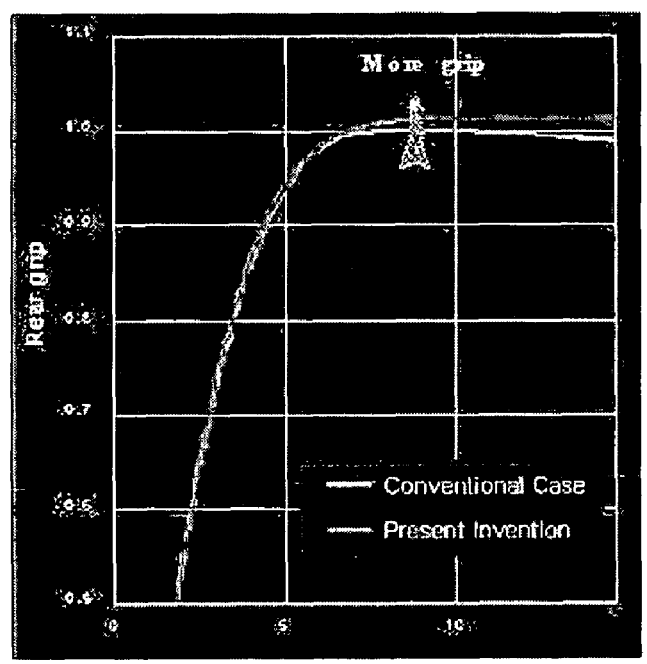

[FIG.9]
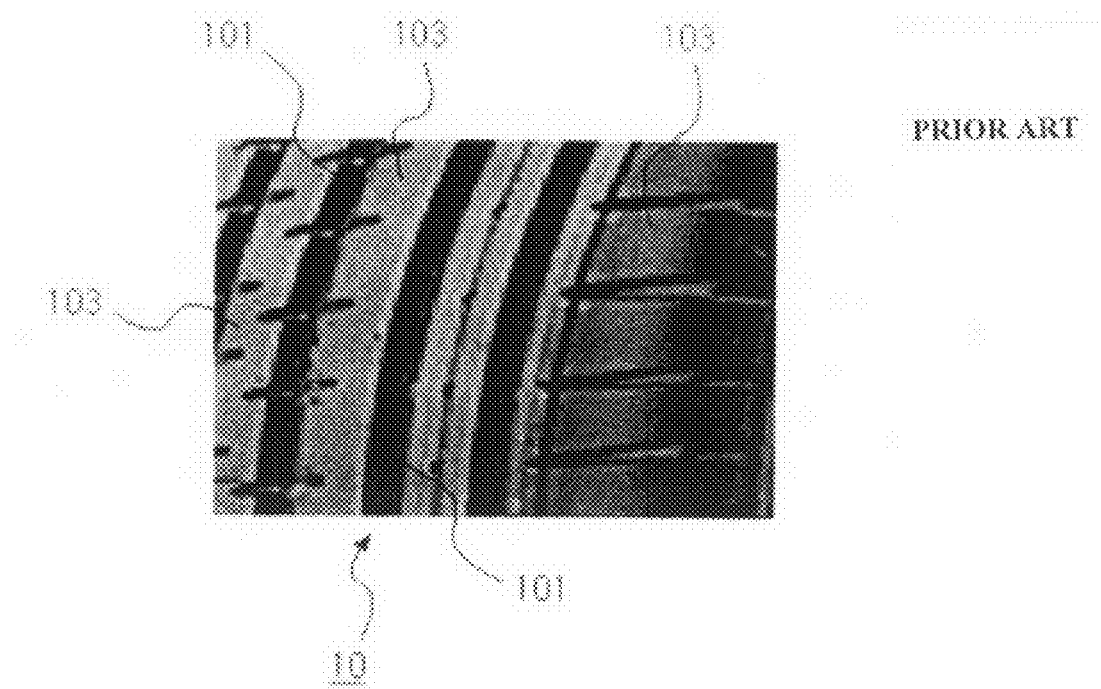
PRIOR ART

TREAD PATTERN HAVING WAVE-SHAPED AND STRAIGHT GROOVES

BACKGROUND OF THE INVENTION

1. Field of the Invention

The present invention relates to a high-performance tire, and, more particularly, to a tread pattern of a tire which has wave-shaped and straight grooves capable of maintaining desired block rigidity and hydroplaning performance of the tire.

2. Description of the Related Art

Recently, high-performance tires have been more favorable to drivers, in particular, drivers of offroad vehicles, because such a high-performance tire exhibits superior handling stability in accordance with a combination of wide tread grooves and a rubber compound used in the tire.

Generally, such a high-performance tire, referred to as an "ultrahigh-performance tire", is defined as a tire enabling high-speed running and having a low aspect ratio, even though the definition is more or less different among tire manufacturers. Such a high-performance tire has features of improved handling and braking performances because the tire is designed to have tread blocks having a size larger than those of radial tires for general cars.

However, although such a high-performance tire practically exhibit considerably superior results in terms of handling and breaking performances, as compared to radial tires for general cars, the tire exhibits a degradation in the performance associated with hydroplaning, that is, slippage of the tire caused by a water film formed on the surface of the tread contacting the ground when the vehicle runs on a wet road, namely, hydroplaning performance, because the grounding length of the tread is reduced due to an increase in the rigidity of the tread caused by the increased grounding width of the tread.

FIG. 9 is a view illustrating a tread pattern of a conventional high-performance tire. This tire includes a tread 10 having straight grooves 101 extending in a running direction of the tire, and blocks 103. In this tread pattern, the width of each straight groove 101 is limited to a certain width, in order to obtain a desired rigidity of the blocks 103.

For this reason, in order to enable the blocks 103 itself to exhibit superior rigidity, and to prevent degradation in block rigidity, it is necessary to limit the width of the straight grooves 101 to a desired small width.

SUMMARY OF THE INVENTION

The present invention has been made in view of the above-mentioned problems incurred in the related art, and it is an object of the invention to provide a tread pattern of a tire which has wave-shaped and straight grooves capable of achieving an enhancement in block rigidity without a degradation in hydroplaning performance, and achieving an enhancement in the handling stability required during cornering.

In accordance with the present invention, this object is accomplished by the provision of a tread pattern of a high-performance tire comprising circumferential main grooves, transversal grooves formed between adjacent ones of the circumferential main grooves, and blocks formed between adjacent ones of the transversal grooves, wherein: at least one of the circumferential main grooves has a wave-shaped structure having opposite inclined side surfaces each comprising an upper surface portion having first and second curved surfaces alternately arranged along a circumferential direction of the tire while having substantially opposite curvatures, respectively, to form a continuous wave-shaped surface, and a lower surface portion having a straight side surface connected to the alternate first and second curved surfaces while extending along the circumferential direction to form a circumferential straight groove.

This tread pattern is made in accordance with a principle wherein, although a flat surface having no curvature is easily depressed when being subjected to a pressing force, thereby exhibiting high strain, a curved surface having a certain curvature is hardly depressed when being subjected to a pressing force, thereby exhibiting little strain. Since at least one of the circumferential grooves in the tread pattern according to the present invention takes the form of a combination of a straight groove and a wave-shaped groove, it is possible to obtain optimal block rigidity without a degradation in water drain ability.

BRIEF DESCRIPTION OF THE DRAWINGS

The above objects, and other features and advantages of the present invention will become more apparent after reading the following detailed description when taken in conjunction with the drawings, in which:

FIG. 1 is a perspective view illustrating a part of a tire tread having wave-shaped and straight grooves according to the present invention;

FIG. 2 is a schematic plan view illustrating circumferential wave-shaped and straight grooves in the tire tread of FIG. 1;

FIG. 3 is an exploded cross-sectional view taken along the line I-I in FIG. 2;

FIGS. 4 to 6 are views illustrating distribution of grounding pressure in the tire according to the present invention, respectively;

FIGS. 7 and 8 are graphs for comparing the grip force in the tire of the present invention with the grip force in a conventional tire; and FIG. 9 is a perspective view illustrating a part of a conventional tire tread.

DESCRIPTION OF THE PREFERRED EMBODIMENTS

Hereinafter, the present invention will be described in detail with reference to the annexed drawings.

FIG. 1 is a perspective view illustrating a part of a tire tread, to which the present invention is applied. FIG. 2 is a schematic plan view illustrating circumferential wave-shaped and straight grooves in the tire tread of FIG. 1. FIG. 3 is an exploded cross-sectional view taken along the line I-I in FIG. 2.

Referring to FIG. 1, a tread pattern of a high-performance tire according to the present invention is illustrated. As shown in FIG. 1, the tread pattern includes several circumferential main grooves 1, transverse grooves 2 formed between adjacent main grooves 1, and blocks 3 formed between adjacent transverse grooves 2. In accordance with the present invention, at least one of the circumferential main grooves 1 is formed to have a wave shape. As shown in FIGS. 2 and 3, the wave-shaped main groove 1 has opposite inclined side surfaces each including an upper surface portion having first and second curved surfaces W1 and W2 alternately arranged along the circumferential direction while having substantially opposite curvatures, respectively, to form a continuous wave-shaped surface, and a lower surface portion having a straight side surface S1 connected to the alternate first and second curved surfaces W1 and W2 while extending along the circumferential direction to form a circumferential straight groove 4.

It is preferred that the ratio between the height WH of the first and second curved surfaces W1 and W2 and the height SH of the straight surface S1 be 8:2. However, other height ratios may be used, if necessary.

In accordance with the present invention, the angle $a_1$ between each first curved surface W1 and a virtual vertical line extending through an intersection between the first curved surface W1 and the straight side surface S1 connected to the first curved surface W1 is set to 15°. Also, the angle $a_2$ between each second curved surface W2 and a virtual vertical line extending through an intersection between the second curved surface W2 and the straight side surface S1 connected to the second curved surface W2 is set to 60°. Accordingly, the upper surface portion of each inclined side surface of the main groove 1 has an inclination varying gradually between the angles $a_1$ and $a_2$.

The width SW of the straight groove 4 formed at the lower portion of the wave-shaped circumferential main groove 1 and the width AW of each second curved surface W2 are set such that the width AW is higher than the width SW, but is not higher than 1.2 times the width SW.

Since the wave-shaped circumferential main groove 1 has a structure including a combination of the straight groove 4 and the wave-shaped groove arranged over the straight groove 4 in accordance with the present invention, it is possible to prevent degradation in water drain ability while maintaining desired rigidity of the blocks 3. The first and second curved surfaces W1 and W2 of the main groove 1 are smoothly connected to form a continuous wave-shaped surface having an inclination varying gradually and smoothly. Also, the angle $a_1$ of each first curved surface W1 is small, and the angle $a_2$ of each second curved surface W2 is larger than the angle $a_1$.

In accordance with the above-described structure, at each first curved surface W1, the wave-shaped circumferential main groove 1 exhibits high resistance to vertical motion and low resistance to lateral motion.

On the other hand, at each second curved surface W2, the wave-shaped circumferential main groove 1 exhibits a slight degradation in the resistance to vertical motion, but exhibits high resistance to lateral motion. However, since the first and second curved surfaces W1 and W2 are alternately repeatedly arranged, they complement each other to compensate for insufficient resistances to vertical and lateral motions, thereby maintaining maximal strength of the blocks.

When curved inclined surfaces according to the above-described principle are formed at opposite sides of each block, it is possible to reduce the strain of the block, and thus, to secure high block rigidity.

Such a block structure serves to enhance the traction performance of the tread during the straight running of the tire. Even during abrupt steering or cornering, the block structure exhibits reduced strain, thereby achieving superior handling performance.

The wave-shaped main groove 1 having wave-shaped and straight grooves, as described above, provides circumferentially-uniform block rigidity, and thus, an improvement in grip performance. Referring to the grounding pressure of the tread 10 according to the present invention shown in FIG. 4, it can be seen that uniform grounding pressure distribution is exhibited at the outer portion of the tread where the wave-shaped circumferential main groove 1 is arranged.

Also, the tire, to which the present invention is applied, exhibits high front/rear grip at a high slip angle, as compared to conventional tires. Accordingly, more stable cornering is possible (FIGS. 7 and 8).

Also, from evaluation of traction performance exhibited during accelerated running, it can be experimentally seen that ribs, to which the main groove according to the present invention is applied, exhibit superior block rigidity to conventional ribs.

That is, in FIG. 5 showing the results of a computer simulation, arrows having a shorter length and a smaller head represent higher block rigidity.

In other words, it can be assumed that the arrows having a shorter length and a smaller head represent blocks exhibiting reduced strain. In FIG. 5, the grey-scale image includes a shade of grey (labeled R) that represent a distribution of higher pressure. Accordingly, tread portions exhibiting low block rigidity are represented by the regions having the shade of grey (labeled R).

Referring to FIG. 5, it can be seen that the rib G1 formed with the wave-shaped main groove 1 exhibited higher block rigidity than that of the rib G2 not formed with the wave-shaped main groove 1. Accordingly, the rib G1 exhibits high resistance to acceleration during running, thereby securing high traction performance.

FIG. 6 shows data obtained in a cornering simulation for measuring lateral force applied to the blocks. Referring to FIG. 6, it can be seen that the blocks in a region F1 are subjected to higher pressure due to centrifugal force generated during cornering.

The region to be subjected to higher pressure, next to the region F1, is the region F2. Referring to the grey-scale shading in FIG. 6, it can be seen that the wave-shaped main groove can secure higher block rigidity than those of conventional general straight main grooves. Accordingly, even when the wave-shaped main groove has an increased groove volume to obtain advantageous effects in terms of hydroplaning, it is possible to maintain block rigidity equivalent to those of tread patterns, to which only the conventional straight grooves are applied.

As apparent from the above description, the tread pattern having wave-shaped and straight grooves according to the present invention has advantages in that it is possible to achieve an enhancement in block rigidity without a degradation in hydroplaning performance, and to achieve an enhancement in the handling stability required during cornering.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A tread pattern of a high-performance tire, the tire having a tire surface, comprising:
   (a) a plurality of circumferential main grooves, at least one circumferential main groove extending from a lower level up to the tire surface, the at least one circumferential main groove including:
   (i) a lower channel structure including straight and opposing first and second lower sides, wherein the first and second lower sides each terminate at first edges located at a point between the lower level of the at least one circumferential main groove and the tire surface, and
   (ii) an upper portion including inclined first and second upper sides that extend from the respective first edges up to the tire surface and terminate in second edges, wherein a width between the second edges is larger than a width between the first edges, wherein the first upper side forms a first angle with respect to a virtual vertical line, the first angle varying about the circumference of the tire in a range from about 15° to about 60°, wherein the first upper side forms a first three-dimensional wave shaped surface, wherein the second upper side forms a second angle with respect to the virtual vertical line, the second angle varying about the circumference of the tire in a range from about 15° to about 60°, wherein the second upper side forms a second three-dimensional wave shaped surface, a ratio of a height of each of the first and second upper sides and a height of the first and second lower sides is about 8:2, and wherein $SW < AW \leq 1.2SW$ where SW is the width between the first edges, and AW is a greatest width of one of the first and second upper sides;

(b) transversal grooves formed between adjacent ones of the circumferential main grooves; and (c) blocks formed between adjacent ones of the transversal grooves.

2. The tread pattern of claim 1, wherein the width between the second edge of the first upper side and the second edge of second upper side remains constant.

3. The tread pattern of claim 1, wherein the first and second lower sides are not parallel.

4. A tread pattern of a high-performance tire, the tire having a tire surface, comprising:

(a) a plurality of circumferential main grooves, at least one circumferential main groove extending from a lower level up to the tire surface, the at least one circumferential main groove including:

(i) a lower channel structure including straight and opposing first and second lower sides, wherein the first and second lower sides each terminate at first edges located at a point between the lower level of the at least one circumferential main groove and the tire surface, and (ii) an upper portion including inclined first and second upper sides that extend from the respective first edges up to the tire surface and terminate in second edges, wherein a substantially constant width between the second edges is larger than a substantially constant width between the first edges, wherein the first upper side forms a first angle with respect to a virtual vertical line, the first angle varying gradually about the circumference of the tire in a range from about 15° to about 60°, wherein the first upper side forms a first continuous three-dimensional wave shaped surface including alternately and repeatedly arranged first and second curved surfaces, wherein the second upper side forms a second angle with respect to the virtual vertical line, the second angle varying gradually about the circumference of the tire in a range from about 15° to about 60°, wherein the second upper side forms a second continuous three-dimensional wave shaped surface including alternately and repeatedly arranged third and fourth curved surfaces, and wherein a ratio of a height of each of the first and second upper sides and a height of the first and second lower sides is about 8:2, and wherein $SW < AW \leq 1.2SW$ where SW is the substantially constant width between the first edges, and AW is a greatest width of one of the first and second upper sides;

(b) transversal grooves formed between adjacent ones of the circumferential main grooves; and (c) blocks formed between adjacent ones of the transversal grooves.

* * * * *